K. SCHMIEDEL.
ELECTRIC METER.
APPLICATION FILED DEC. 7, 1914.

1,201,639.

Patented Oct. 17, 1916.
2 SHEETS—SHEET 1.

Witnesses:

Inventor:
Karl Schmiedel,
by
His Attorney.

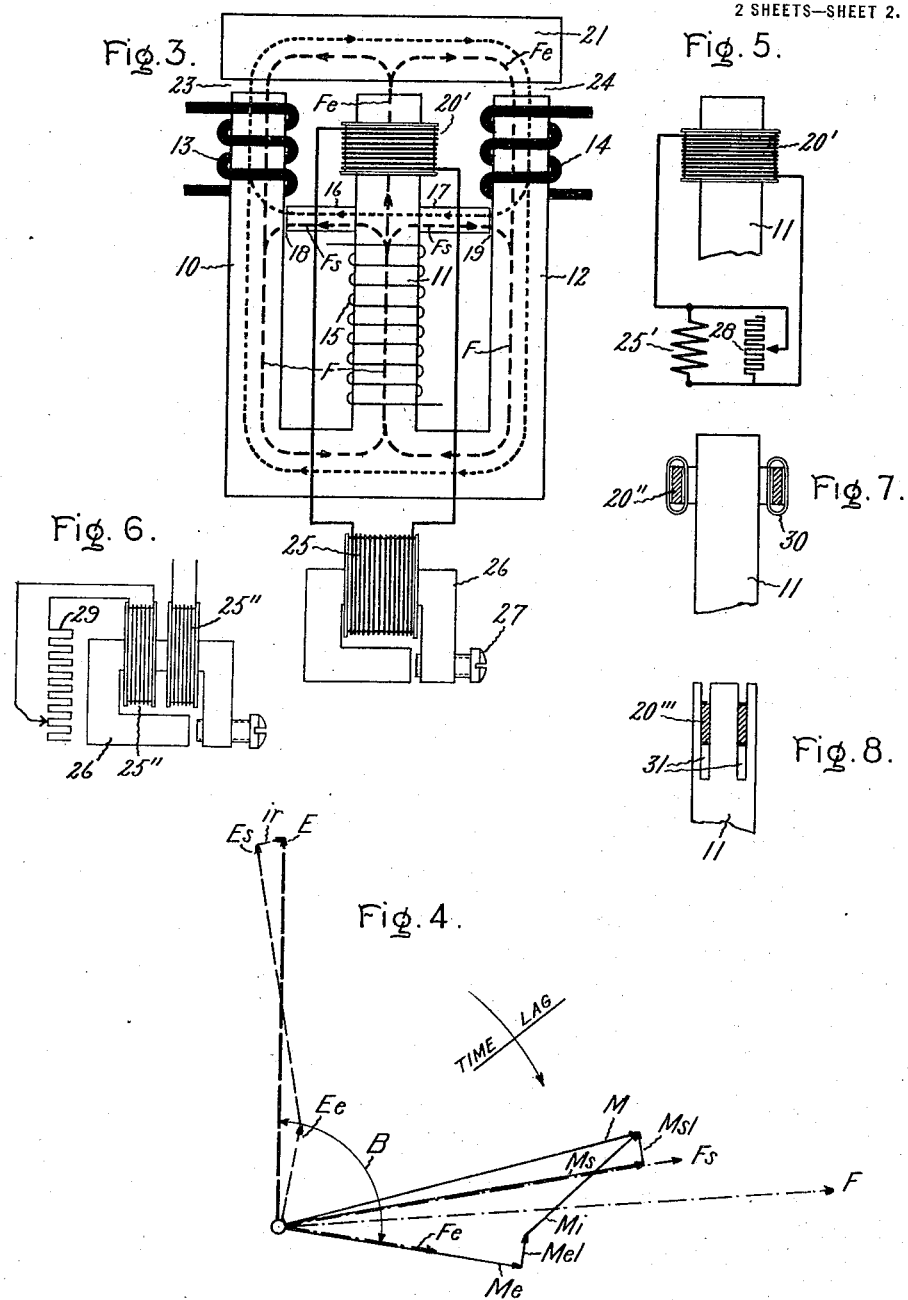

UNITED STATES PATENT OFFICE.

KARL SCHMIEDEL, OF CHARLOTTENBURG, GERMANY, ASSIGNOR TO GENERAL ELECTRIC COMPANY, A CORPORATION OF NEW YORK.

ELECTRIC METER.

1,201,639.      Specification of Letters Patent.      Patented Oct. 17, 1916.

Application filed December 7, 1914. Serial No. 875,793.

*To all whom it may concern:*

Be it known that I, KARL SCHMIEDEL, a subject of the King of Saxony, residing at Charlottenburg, Germany, have invented certain new and useful Improvements in Electric Meters, of which the following is a specification.

My invention relates to electric meters, and particularly to alternating current induction meters.

More particularly my invention relates to induction meters having a short-circuited coil or winding for producing the desired angle of phase lag or displacement between the torque-producing potential and current fluxes.

The object of my invention is to provide in an induction electric meter novel means for rendering the phase angle between the torque-producing or motorial potential and current fluxes substantially independent of frequency variations.

More particularly the object of my invention is to provide novel means acting in conjunction with a locally short-circuited phase lagging coil or winding of an induction meter for compensating the angle of phase lag between the motorial potential and current fluxes for variations in frequency.

Figure 1:
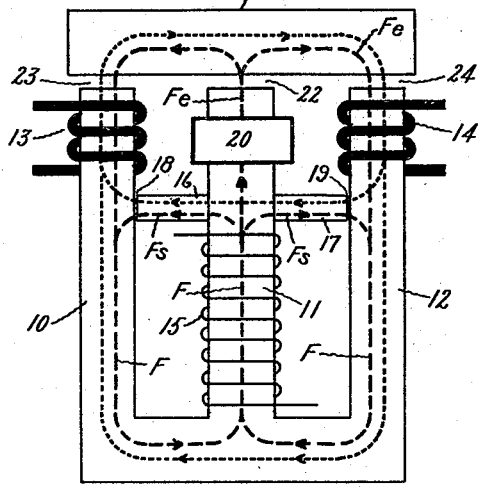
Figure 2:
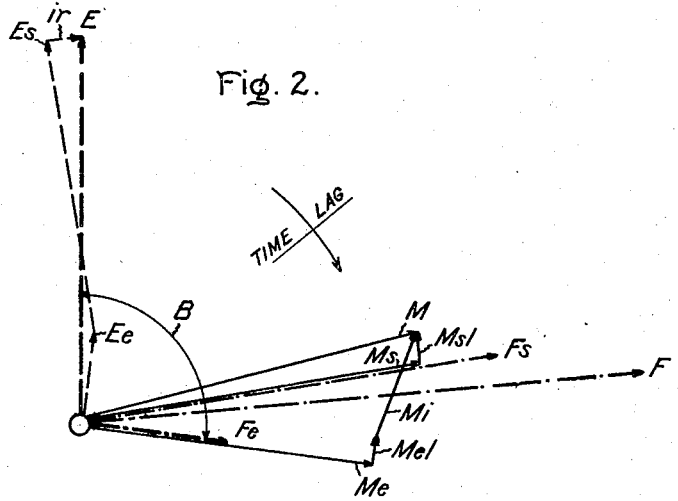

The novel features of my invention which I believe to be patentable and upon which I desire to secure Letters Patent are definitely indicated in the claims appended hereto. These novel features of the invention, together with the construction and operation of an electric meter embodying the same, will be understood from the following description taken in connection with the accompanying drawings, in which;

Figure 1 is a diagrammatic explanatory view of the magnetic circuit of a well known type of induction electric meter; Fig. 2 is a vector diagram of the electrical and magnetic quantities of the magnetic circuit of Fig. 1; Fig. 3 is a diagrammatic view of the magnetic circuit of an induction electric meter embodying my present invention; Fig. 4 is a vector diagram of the electrical and magnetic quantities of the magnetic circuit represented in Fig. 3; and Figs. 5, 6, 7 and 8 illustrate modified forms of the invention.

Alternating current electric meters of the induction type correctly indicate or register the load of an electrical installation only when the motorial magnetic fluxes of the potential or voltage circuit and of the current or load circuit are displaced in time phase from each other by 90 electrical degrees. By motorial magnetic flux, I mean a flux which is effective in producing a turning or motor movement of the movable element of the meter, or in other words, an effective torque-producing flux. The necessary phase displacement of 90° can be effected by a locally short-circuited coil or winding which affects the motorial flux of the potential circuit. The magnetic circuit of an induction meter of this type is diagrammatically illustrated in Fig. 1 of the drawings.

The magnetic circuit illustrated in Fig. 1 comprises a magnetic core of the usual laminated character having three legs or prongs 10, 11 and 12. Current coils 13 and 14, adapted to be connected in series relation with the electrical installation whose energy consumption is to be metered, are mounted on the outside legs 10 and 12 in the well known manner, while a potential coil, adapted to carry a current dependent upon the voltage of such an electrical installation, is mounted on the middle leg 11. Bridges 16 and 17 of iron or similar magnetic material provide magnetic shunts between the outer legs 10 and 12, respectively, and the middle leg 11 of the core. The magnetic shunting members 16 and 17 are separated from the outer legs 10 and 12 by short air gaps 18 and 19, respectively. A locally short-circuited coil or winding 20, comprising a number of short-circuited turns or a single short-circuited turn, is mounted on the middle leg 11 above the magnetic shunting bridges 16 and 17. An armature 21 of magnetic material is operatively positioned above the triple-legged core, and is separated from the middle leg by an air gap 22 and from the outer legs 10 and 12 by air gaps 23 and 24, respectively. It will be understood that the usual disk armature, of copper, aluminum, or equivalent material, of the movable element of the meter is rotatably mounted in the air gaps 22, 23 and 24.

The paths of distribution of the magnetic flux through the magnetic circuit is shown in Fig. 1 by dotted and by dash lines. The dotted lines show the paths of the flux due to the load current flowing in whole or in part through the coils 13 and 14, while the dash lines show the paths of the flux due to the current flowing in the potential coil 15. The paths of the stray fluxes are not indicated in the figure. The potential coil 15 develops a total flux which we will call F. This total flux F is composed of two components. One component Fs is the flux which flows through the nearly closed magnetic circuit formed by the shunting bridges 16 and 17 and the outer legs 10 and 12 and may be termed the shunted potential flux. The second and relatively much smaller component Fe of the total flux F passes across the air gap 22 into the magnetic armature 21 and returns through the air gaps 23 and 24 and the outer legs 10 and 12. This second component Fe of the total flux passes through the rotatable disk of the meter and is motorial, that is, effective in producing a turning torque of the disk and may be termed the motorial or effective potential flux. Since the component Fs of the total flux is shunted through the bridges 16 and 17, it is non-motorial. The effective or motorial component Fe of the total flux induces an electromotive force in the locally short-circuited coil 20 which causes an electric current to flow therein.

The time phase and distribution of the electrical and magnetic quantities associated with the magnetic circuit represented in Fig. 1 are vectorially indicated in Fig. 2. E represents the voltage impressed on the terminals of the potential winding 15, and is henceforth referred to as the terminal voltage. The total flux F lags behind the terminal voltage E in time phase by an angle substantially of the magnitude indicated in the figure. The total flux is composed of the two component fluxes Fs and Fe, the latter considerably smaller in magnitude than the former and having a considerably greater time phase angle of lag. The total ampere turns, that is to say, the total magnetomotive force, of the potential winding 15 is represented by M, and is obviously in time phase with the current flowing through the potential coil. The total ampere turns or magnetomotive force of the potential coil is divided into two components corresponding to the flux components Fs and Fe. Thus, Ms and Me represent the ampere turns or the magnetomotive forces which are necessary to overcome the reluctances of the magnetic circuits to the passage of the fluxes Fs and Fe, respectively. Msl and Mel represent the ampere turns or magnetomotive forces which are necessary to overcome the iron and similar losses in the magnetic circuits through which the fluxes Ms and Me, respectively, pass. Since the motorial and the non-motorial magnetic circuits are in parallel, the vectorial sum of the magnetomotive forces in each circuit must be the same, and each must be equal to the total magnetomotive force M. The magnetomotive force Mi, which acts to induce an electromotive force in the short-circuited coil 20, must therefore combine vectorially with the magnetomotive forces Me and Mel to equal the total magnetomotive force M. Ee is the electromotive force primarily causing the magnetic flux Fe, and Es is the electromotive force primarily causing the flux Fs. These two electromotive forces unite vertically with the ohmic drop in voltage $ir$ of the potential circuit to produce the terminal voltage E.

The motorial flux Fe lags behind the terminal voltage E by an angle B. Since the electric circuit of the current coils 13 and 14 is substantially non-inductive the current in these coils is substantially in phase with the voltage impressed thereon, and hence the magnetic flux developed by the coils 13 and 14 may be assumed to be in phase with the terminal voltage E. The angle B thus represents the angle of phase lag or displacement between the motorial potential and current fluxes. It will be observed from the vector diagram that the angle B can be altered by varying the ampere turns or magnetomotive force Mi which influences the short-circuited coil 15. Thus by proper dimensioning of the short-circuited coil 15 the magnetomotive force, inducing an electromotive force therein, can readily be made so large that the motorial flux Fe lags behind the terminal voltage E by an angle (B) equal to or greater than 90°. In induction meters of this type the angle B varies considerably with variations in frequency. This makes the readings of the meter, for small phase displacement of the line current, considerably in error when there are slight variations of frequency. The object of my present invention is, therefore, to construct or arrange the short-circuited coil so that even with large frequency variations the angle B remains substantially the same as for the normal frequency.

Assume for example that the frequency rises above the normal frequency. The induction in the iron and with it the magnetizing current and also the total current decrease, assuming of course that the terminal voltage E is maintained constant. The ohmic drop in voltage $ir$ is reduced while the angle of phase displacement B is greater than at normal frequency. It is, accordingly, most desirable and even necessary that some compensation be provided for this increase in the phase angle caused by an increase in the frequency. In the present design of induction meters of this type the short-circuited coil 20 is so proportioned that its ohmic resistance exceeds its self-inductance. For regulating the angle of phase displacement B, a winding on the middle leg has, I believe, been heretofore short-circuited through a variable non-inductance resistance. With such an arrangement the phase of the secondary ampere turns M$i$ remains practically unchanged. The above mentioned effect of the change in $ir$ is also important, and as far as I am aware, has not heretofore been compensated for. I have found if the short-circuited coil 20 is so proportioned that its inductance is relatively large with respect to its ohmic resistance, or if the short-circuited coil is closed through a self-inductance, or through a combination of inductance and ohmic resistance, that it is possible to maintain the angle of phase displacement B practically constant with no material change in its value even with large frequency variations.

The principle of my present invention is embodied in the magnetic circuit diagrammatically represented in Fig. 3. Corresponding reference numerals upon this figure represent corresponding elements described in connection with Fig. 1. A number of turns of wire 20′ are placed upon the middle leg 11. The terminals of the coil or winding 20′ are connected to a small self-inductance 25, consisting of a winding mounted upon a magnetic core 26 of iron or equivalent magnetic material. The magnetic core has an adjustable air gap whose width may be adjusted by a screw 27. It will be obvious that the magnetic core 26 may be integrally attached to the three-legged core of the main magnetic circuit or to the magnetic armature 21, and I have merely shown the core 26 as a separate unit for the purpose of explaining the principle of my invention.

The adjustable inductive winding or self-inductance 25 may be replaced by a combination of self-inductance 25′ and non-inductive resistance 28, as diagrammatically illustrated in Fig. 5. The inductive winding 25′ and the non-inductive resistance 28 may both be adjustable or non-adjustable as desired or as conditions dictate.

In Fig. 6 I have shown the inductive winding divided into two coils 25″. One coil 25″ is electrically connected to the terminals of the phase lagging coil 20′, while the other coil 25″ is connected to an adjustable resistance 29. It will of course be understood that an adjustment may also be obtained in the usual way by making the turns of the coil 20′ variable.

Other practical modifications of the invention are represented in Figs. 7 and 8. In the embodiment of Fig. 7 a movable short-circuited coil 20″ is surrounded in sections or over its entire length by an iron or other magnetic body 30. This enveloping of the short-circuited coil, either in whole or in part, with magnetic material makes the self-inductance of the coil large with respect to its ohmic resistance. In Fig. 8 the middle leg 11 of the principal magnetic circuit of the meter is provided with two slots 31 in which a short-circuited coil 20‴ is arranged, whereby the self-induction of the short-circuited coil is materially increased. The short-circuited coil can also be made entirely of iron and the correct value of the ratio of the self-induction to the ohmic resistance may be obtained by proper proportioning. In meters having several coils, the hereinbefore described arrangements may be correspondingly applied.

The vector diagram of Fig. 4 represents the time phases of the electrical and magnetic quantities associated with the magnetic circuit of an induction meter constructed in accordance with my present invention as illustrated in Fig. 3. The secondary current flowing in the coil 20′, or in any equivalent locally short-circuited coil whose electric circuit has relatively large self-inductance with respect to the ohmic resistance thereof, is very much displaced in time phase with respect to the voltage causing the same. With only small variations in frequency its phase changes considerably, and thereby compensates perfectly the effect of the change in the ohmic drop in voltage $ir$ on the angle of phase displacement B between the motorial potential and current fluxes.

It will of course be understood that my invention is not limited to the particular constructions and arrangements of elements herein illustrated and described. Thus, while I have explained my invention by illustrating and describing certain embodiments thereof, it will be understood by those skilled in the art that the invention may be embodied in many other forms than that shown and described. I, accordingly, do not wish to be restricted to the particular arrangements and constructions disclosed herein by way of example for the purpose of setting forth my invention in accordance with the patent statutes. The terms of the appended claims are, therefore, not restricted to the precise structures herein disclosed, but are intended to cover all changes and modifications thereof within the spirit and scope of my invention.

What I claim as new and desire to secure by Letters Patent of the United States is,—

1. In an induction electric meter, means for producing a current flux and a potential flux, a short-circuited coil for displacing the time phase of the potential flux with respect to that of the current flux, and means coöperating with said coil for compensating the angle of phase displacement between the current and potential fluxes for variations in frequency.

2. In an induction electric meter, means for producing a current flux and a potential flux, a magnetic circuit providing two paths for the potential flux whereby a part of said potential flux is effective and a part non-effective, a short-circuited coil for displacing the time phase of the effective component of the potential flux with respect to that of the current flux, and means coöperating with said coil for maintaining the angle of phase displacement between the effective potential and current fluxes substantially constant and independent of variations in frequency.

3. In an induction electric meter, means for producing a current flux and a potential flux, a magnetic circuit providing two paths for the potential flux whereby a part of said potential flux is effective and a part non-effective, a short-circuited coil for displacing the time phase of the effective component of the potential flux with respect to that of the current flux, and means for imparting to the circuit of said coil a relatively large self-inductance with respect to the ohmic resistance thereof.

4. In an induction electric meter, means for producing a current flux and a potential flux, a magnetic circuit providing two paths for the potential flux whereby a part of said potential flux is effective and a part non-effective, a short-circuited coil for displacing the time phase of the effective component of the potential flux with respect to that of the current flux, an inductance connected in the circuit with said coil, and means for adjusting the inductance of the electric circuit including said coil and said inductance.

5. In an induction electric meter, means for producing a current flux and a potential flux, a magnetic circuit providing two paths for the potential flux whereby a part of said potential flux is effective and a part non-effective, a short-circuited coil for displacing the time phase of the effective component of the potential flux with respect to that of the current flux, and an inductance and a non-inductive resistance electrically connected to said coil.

In witness whereof, I have hereunto set my hand this 5th day of November, 1914.

KARL SCHMIEDEL.

Witnesses:
 AUGUST MOOR,
 WALTER COHN-BYK.